US010734152B2

(12) United States Patent
Ryu et al.

(10) Patent No.: US 10,734,152 B2
(45) Date of Patent: Aug. 4, 2020

(54) COIL COMPONENT AND METHOD OF MANUFACTURING THE SAME

(71) Applicant: SAMSUNG ELECTRO-MECHANICS CO., LTD., Suwon-Si, Gyeonggi-Do (KR)

(72) Inventors: Han Wool Ryu, Suwon-Si (KR); Byoung Hwa Lee, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 42 days.

(21) Appl. No.: 14/995,103

(22) Filed: Jan. 13, 2016

(65) Prior Publication Data

US 2016/0314889 A1 Oct. 27, 2016

(30) Foreign Application Priority Data

Apr. 24, 2015 (KR) ........................ 10-2015-0058237

(51) Int. Cl.

*H01F 27/29* (2006.01)
*H01F 27/255* (2006.01)
*H01F 41/02* (2006.01)
*H01F 17/00* (2006.01)
*B32B 15/00* (2006.01)
*H01F 17/04* (2006.01)

(52) U.S. Cl.

CPC ....... *H01F 27/255* (2013.01); *H01F 17/0013* (2013.01); *H01F 41/0246* (2013.01); *H01F 27/292* (2013.01); *H01F 2017/048* (2013.01)

(58) Field of Classification Search

CPC .......... H01F 27/55; H01F 17/04; H01F 41/16; H01F 1/06; H01L 2924/30107

USPC ........................................ 336/192; 428/692.1

See application file for complete search history.

(56) References Cited

U.S. PATENT DOCUMENTS 2,388,664 A * 11/1945 Bandur ................ H01F 1/1475 148/100
3,228,881 A * 1/1966 Thomas ................ B22F 1/0022 252/62.54

(Continued)

FOREIGN PATENT DOCUMENTS

CN 104021909 A 9/2014
CN 104347228 A 2/2015

(Continued)

OTHER PUBLICATIONS

Notice of Office Action issued in corresponding Japanese Patent Application No. 2016-003654, dated Nov. 29, 2016; with English translation.

(Continued)

*Primary Examiner* — Alexander Talpalatski
*Assistant Examiner* — Joselito S Baisa
(74) *Attorney, Agent, or Firm* — Morgan, Lewis & Bockius LLP

(57) ABSTRACT

A coil component includes a body having a coil part disposed therein and an external electrode connected to the coil part. The body includes magnetic particles, and the magnetic particles include first magnetic particles, second magnetic particles, and third magnetic particles. A diameter of each of the first, second, and third magnetic particles is different from each other.

17 Claims, 7 Drawing Sheets

P

(56) References Cited

U.S. PATENT DOCUMENTS 3,250,831 A * 5/1966 Hooper ................. H01F 41/028 264/108
3,255,052 A * 6/1966 Opitz ...................... C22C 32/00 148/100
3,451,934 A * 6/1969 Hubbard ................... H01F 1/26 252/62.54
4,036,638 A * 7/1977 Ray ....................... C22C 45/008 148/304
4,696,100 A * 9/1987 Yamamoto ........... H01F 17/045 29/605
4,796,077 A * 1/1989 Takeda .................. C04B 35/581 257/705
5,349,743 A * 9/1994 Grader ................ H01F 17/0033 156/89.12
5,370,749 A * 12/1994 Ames .................. H01F 1/15308 148/304
8,212,641 B2 * 7/2012 Wu ....................... H01F 17/045 336/221
8,362,866 B2 * 1/2013 Matsuura .................. B22F 1/02 336/200
8,378,777 B2 * 2/2013 Yan ..................... H01F 17/0013 336/192
8,866,579 B2 10/2014 Hachiya et al.
8,920,670 B2 * 12/2014 Harada ..................... H01F 1/26 252/62.51 C
9,406,420 B2 8/2016 Ohkubo et al.
2005/0244575 A1 * 11/2005 Mase ....................... B05D 1/12 427/180
2006/0165985 A1 * 7/2006 Matsukawa ............... H01F 1/26 428/384
2006/0170524 A1 * 8/2006 Fujiwara ............. H01F 1/15366 336/83
2006/0254385 A1 * 11/2006 Tsuji ....................... H01F 1/015 75/244
2010/0188075 A1 * 7/2010 Litvinov .......... G01N 33/54373 324/214
2012/0003386 A1 * 1/2012 Bockmeyer ............. C07F 5/003 427/226
2012/0188049 A1 * 7/2012 Matsuura .................. B22F 1/02 336/212
2013/0136983 A1 * 5/2013 Nakatsuji .............. H01M 4/383 429/218.2
2013/0293334 A1 11/2013 Shin
2014/0062640 A1 3/2014 Sasamori et al.
2014/0077914 A1 * 3/2014 Ohkubo .................... H01F 5/00 336/177
2014/0240071 A1 * 8/2014 Alderton ............. H01F 17/0013 336/200
2014/0240077 A1 8/2014 Otsuka et al.
2015/0028983 A1 1/2015 Ryu et al.
2015/0035635 A1 * 2/2015 Hayashi ................ H01F 17/045 336/192
2015/0115766 A1 * 4/2015 Taguchi .................... B22F 1/02 310/216.001
2015/0213938 A1 * 7/2015 Sakaguchi .............. H01F 37/00 336/96
2015/0287507 A1 * 10/2015 Nishio ...................... H01F 1/26 335/297
2017/0098494 A1 * 4/2017 Dalton ..................... H01B 1/22

FOREIGN PATENT DOCUMENTS

JP 2000294418 A * 10/2000 ......... H01F 41/0266
JP 2007-200962 A 8/2007
JP 2008166455 A 7/2008
JP 2009-174034 A 8/2009
JP 2014-060284 A 4/2014
JP 2014067991 A 4/2014
JP 2014-167953 A 9/2014
JP 2015-026812 A 2/2015
KR 10-2013-0123252 A 11/2013
KR 10-2015-0014346 A 2/2015

OTHER PUBLICATIONS

Notice of Office Action issued in corresponding Korean Patent Application No. 10-2015-0058237, dated Apr. 21, 2016, with English translation.
The First Office Action issued in corresponding Chinese Patent Application No. 201610041127.7, dated Sep. 1, 2017; with English translation.
Korean Office Action dated Dec. 3, 2018 issued in Korean Patent Application No. 10-2016-0180988 (with English translation).

* cited by examiner

COIL COMPONENT AND METHOD OF MANUFACTURING THE SAME

CROSS-REFERENCE TO RELATED APPLICATION

This application claims the benefit of priority to Korean Patent Application No. 10-2015-0058237 filed on Apr. 24, 2015, with the Korean Intellectual Property Office, the disclosure of which is incorporated herein by reference.

TECHNICAL FIELD

The present disclosure relates to a coil component and a method of manufacturing the same.

BACKGROUND

An inductor, as an electronic component, is a representative passive element configuring an electronic circuit together with a resistor and a capacitor to remove noise.

A thin film type inductor may be manufactured by forming internal coil parts by plating and hardening a magnetic powder-resin composite in which magnetic powders and resins are mixed with each other to manufacture a body, and forming external electrodes on outer surfaces of the body.

SUMMARY

An aspect of the present disclosure may provide a coil component and a method of manufacturing the same.

According to an exemplary embodiment in the present disclosure, a coil component includes a body having a coil part disposed therein and an external electrode connected to the coil part. The body includes magnetic particles. The magnetic particles include first magnetic particles, second magnetic particles, and third magnetic particles, of which diameters differ from one another.

According to another exemplary embodiment in the present disclosure, a coil component includes a body having a coil part embedded therein. The body includes a plurality of magnetic particles which have grain size distribution of a first peak, a second peak, and a third peak. A grain size of the magnetic particles corresponding to the third peak is four through fifteen times larger than that of the magnetic particles corresponding to the second peak, and the grain size of the magnetic particles corresponding to the second peak is two through seven times larger than that of the magnetic particles corresponding to the first peak.

According to still another exemplary embodiment in the present disclosure, a method of manufacturing a coil component comprises: preparing a coil part by forming a coil pattern on at least one surface of a substrate layer; forming a body by stacking and compressing magnetic bodies on upper and lower portions of the coil part; and forming an external electrode on an outer surface of the body so that the external electrode is connected to the coil pattern. The body includes magnetic particles, and the magnetic particles include first magnetic particles, second magnetic particles, and third magnetic particles, of which diameters differ from one another.

BRIEF DESCRIPTION OF THE DRAWINGS

The above and other aspects, features, and advantages of the present disclosure will be more clearly understood from the following detailed description taken in conjunction with the accompanying drawings.

DETAILED DESCRIPTION

Figure 1:
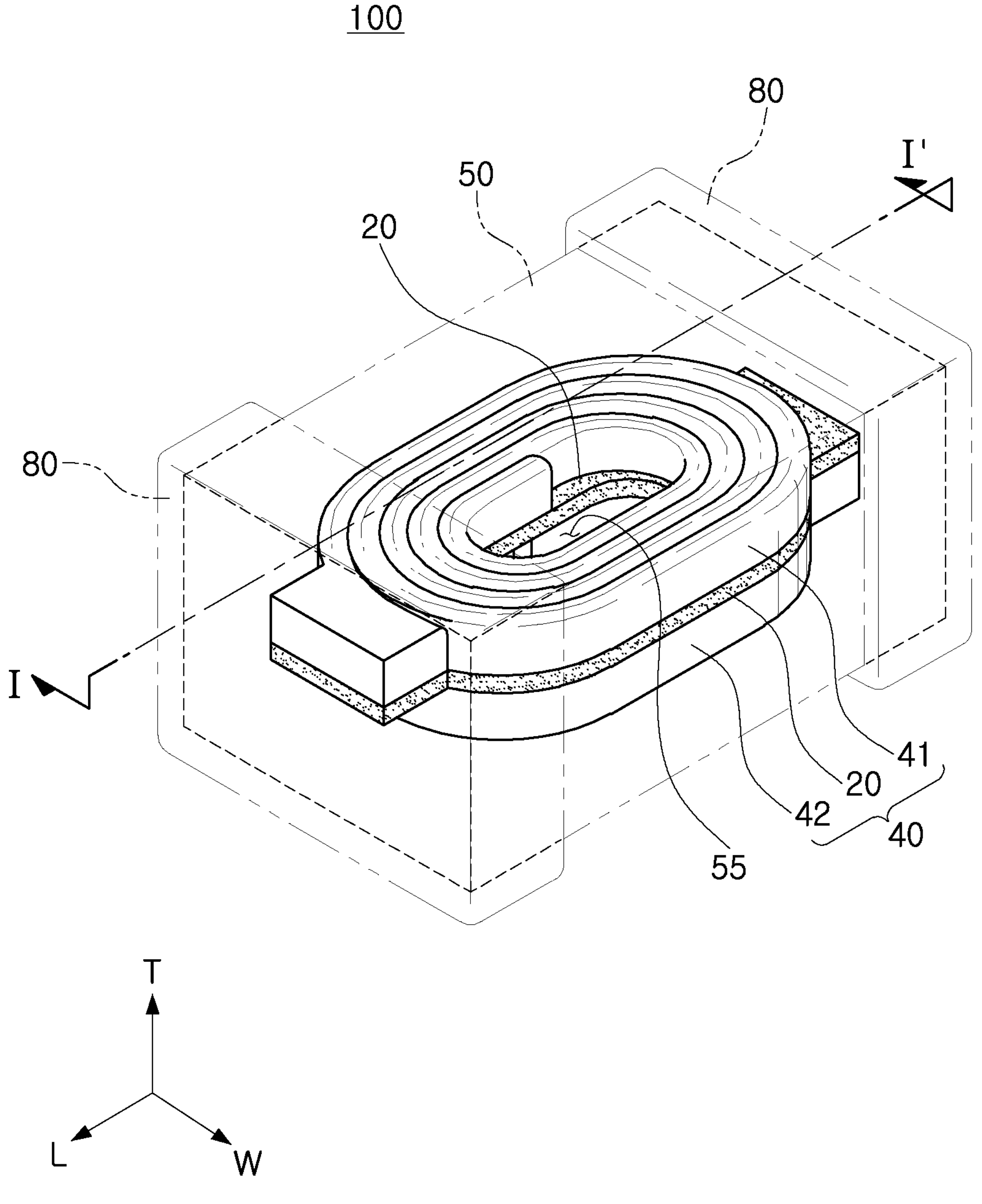
FIG. 1 is a schematic perspective view illustrating a coil part disposed in a coil component according to an exemplary embodiment in the present disclosure.

Hereinafter, embodiments in the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Hereinafter, a coil component according to an exemplary embodiment, particularly, an inductor, will be described. However, the exemplary embodiment is not limited thereto.

Figure 2:
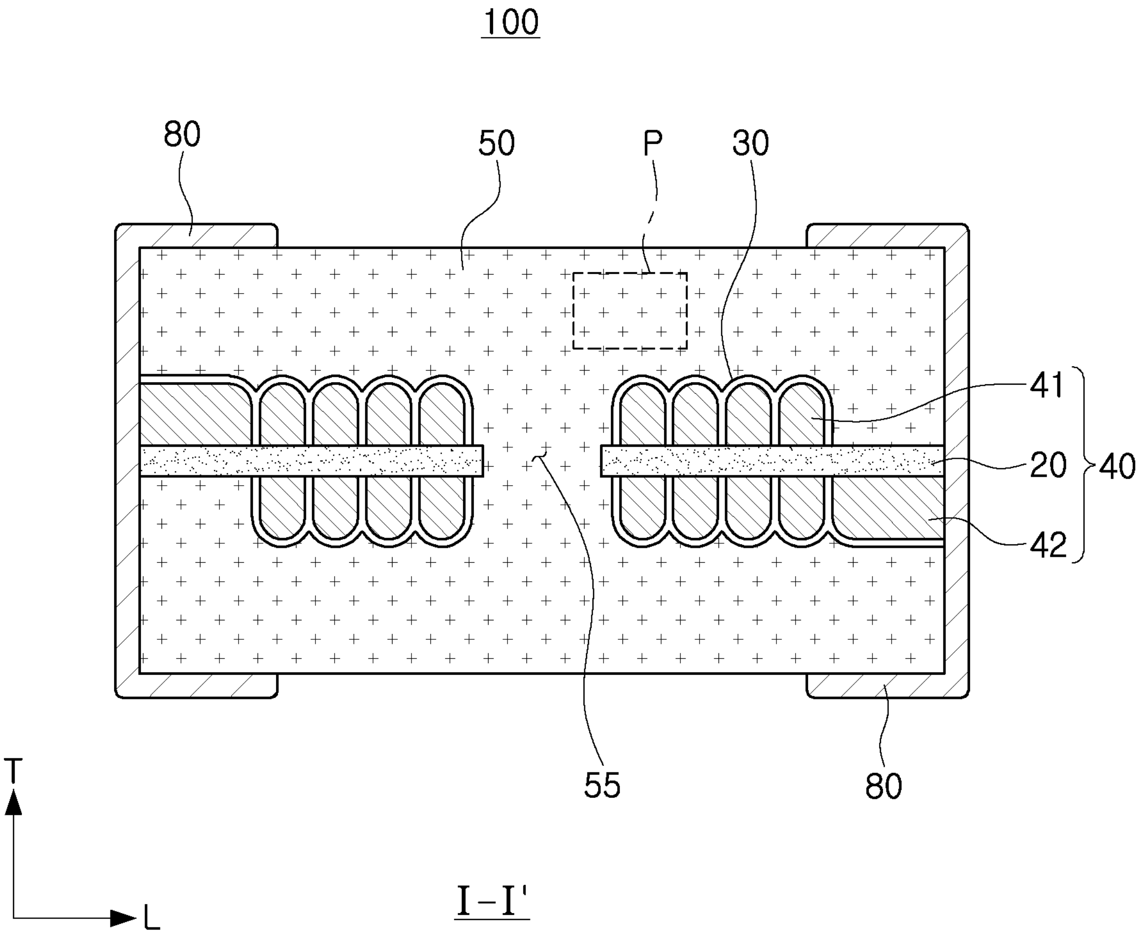
FIG. 2 is a cross-sectional view taken along the line A-A' of FIG. 1.

FIG. 1 is a schematic perspective view illustrating a coil part disposed in a coil component according to an exemplary embodiment in the present disclosure, and FIG. 2 is a cross-sectional view taken along the line A-A' of FIG. 1.

Referring to FIGS. 1 and 2, an inductor for a power supply line of a power supply circuit is shown as an example of the coil component. However, it is not limited to an inductor, but the coil component according to the exemplary embodiment may be appropriately applied as beads, a filter, or the like.

A coil component 100 may include a body 50 and external electrodes 80, and the body 50 may include a substrate layer 20 and a coil part 40 including coil patterns 41 and 42.

The body 50 may have an approximately hexahedral shape. L, W, and T shown in FIG. 1 refer to a length direction, a width direction, and a thickness direction, respectively.

The body 50 may include first and second surfaces opposing each other in the thickness direction, third and fourth surfaces opposing each other in the length direction, and a fifth and sixth surfaces opposing each other in the width direction. The body 50 may have a rectangular parallelepiped shape in which a length thereof in the length direction is larger than a length thereof in the width direction.

The body 50 may define the appearance of the coil component 100 and may include magnetic materials having magnetic properties thereinto.

The magnetic materials may have a powder form and may be included in the body 50 in a state in which the magnetic material is dispersed in a polymer such as an epoxy resin, polyimide, or the like.

As illustrated in FIG. 2, the coil part 40 may be disposed in the body 50. The coil part 40 may include the substrate layer 20 and the coil patterns 41 and 42 disposed on at least one surface of the substrate layer 20.

The substrate layer 20 may include, for example, polypropylene glycol (PPG), ferrite, metal-based soft magnetic material, or the like.

A through hole may be formed in a central portion of the substrate layer 20, and may be filled with the magnetic material included in the body 50 to form a core part 55. The core part 55 may be formed by filling the through hole with the magnetic materials, thereby improving inductance (L) of the inductor.

First coil patterns 41 having a coil shape may be formed on one surface of the substrate layer 20, and second coil patterns 42 having a coil shape may be formed on another surface of the substrate layer 20 opposing the one surface of the substrate layer 20.

The coil patterns 41 and 42 may have a spiral shape, and the first and second coil patterns 41 and 42 formed on the one surface and the other surface of the substrate layer 20, respectively, may be electrically connected to each other through a via electrode (not illustrated) formed in the substrate layer 20.

One end portion of the first coil pattern 41 disposed on the one surface of the substrate layer 20 may be exposed to one surface of the body 50 in the length direction, and one end portion of the second coil pattern 42 disposed on the other surface of the substrate layer 20 may be exposed to the other surface of the body 50 in the length direction.

The external electrodes 80 may be formed on both surfaces of the body 50 in the length direction to be connected to the exposed end portions of the coil patterns 41 and 42. The coil patterns 41 and 42, the via electrode (not illustrated), and the external electrodes 80 may include a metal having excellent electrical conductivity, such as silver (Ag), copper (Cu), nickel (Ni), aluminum (Al), alloys thereof, or the like.

According to the exemplary embodiment, the coil patterns 41 and 42 may be covered with an insulating layer 30.

The insulating layer 30 may be formed by a method well-known in the art such as a screen printing method, an exposure and development method of a photo resist (PR), a spray application method, or the like. The coil patterns 41 and 42 may be covered with the insulating layer 30 so as not to be in direct contact with the magnetic materials included in the body 50.

Figure 3:
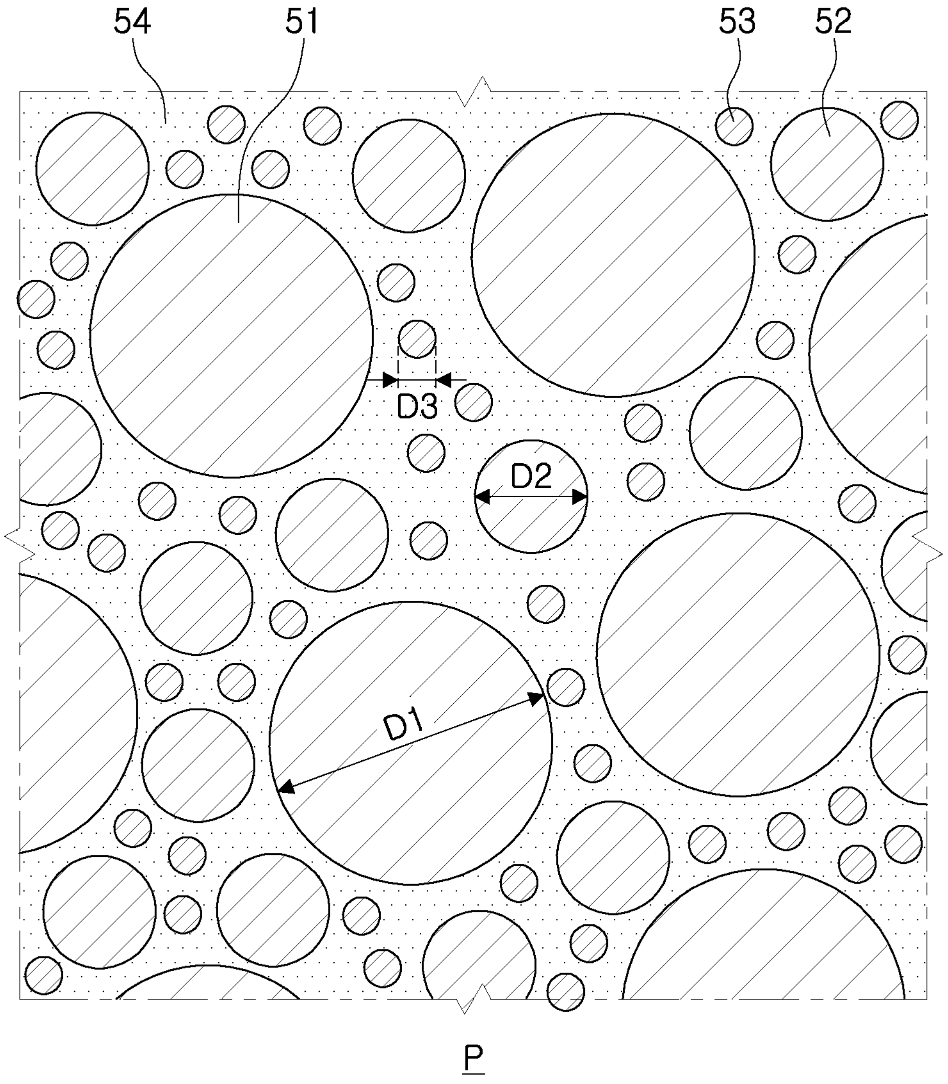
FIG. 3 is an enlarged view of region P of FIG. 2.

FIG. 3 is an enlarged view of region P of FIG. 2.

Referring to FIGS. 2 and 3, the body 50 may include a magnetic material having magnetic properties, and as illustrated in FIG. 3, the magnetic material may be dispersed in a thermosetting resin 54 of epoxy resin, polyimide, or the like, in a form of a plurality of magnetic particles 51, 52, and 53.

According to the exemplary embodiment, the body 50 may include first magnetic particles 51, second magnetic particles 52, and third magnetic particles 53, in which diameter D1 of the first magnetic particles 51 may range from 8 μm to 30 μm, diameter D2 of the second magnetic particles 52 may range from 2.5 μm to 5.0 μm, and diameter D3 of the third magnetic particles 53 may be equal to or less than 1.5 μm.

The body 50 may be formed by mixing the first through third magnetic particles 51, 52, and 53 having a grain size distribution as described above to improve density, and thus permittivity may be improved, thereby improving inductance and an inductor saturation (Lsat) value.

Figure 4:
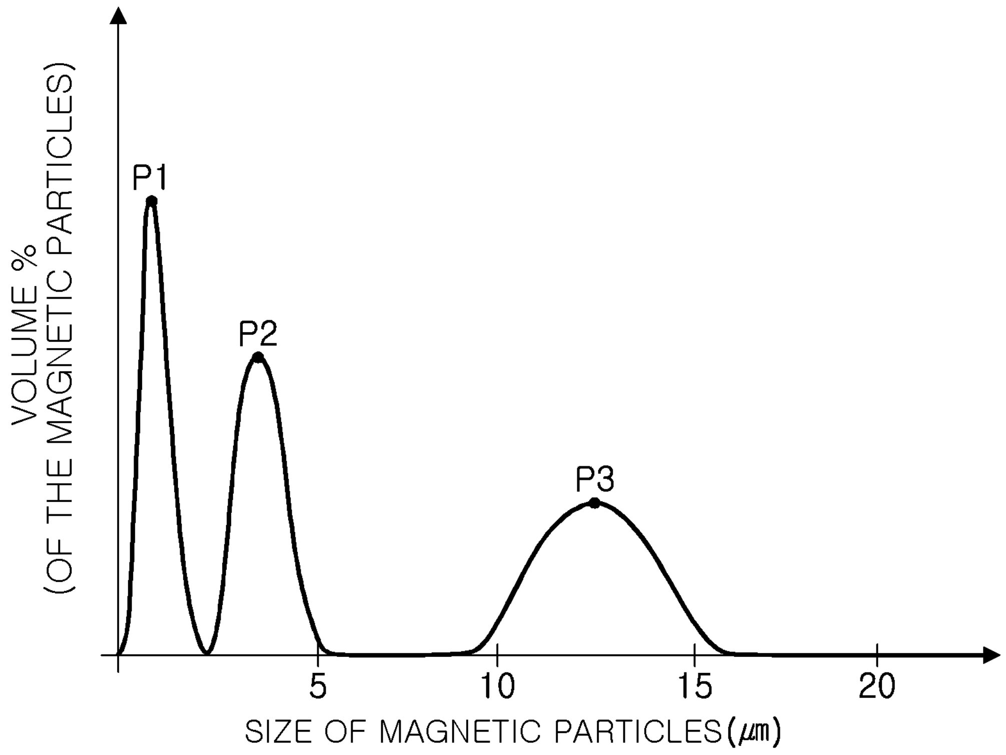
FIG. 4 is a graph illustrating an example of a grain size distribution of magnetic particles included in a body according to an exemplary embodiment in the present disclosure.

FIG. 4 is a graph illustrating an example of the grain size distribution of the magnetic particles 51, 52, and 53 included in the body 50 according to an exemplary embodiment.

The body 50 according to the exemplary embodiment includes the plurality of magnetic particles, and the graph illustrating the grain size distribution of the magnetic particles included in the body 50 includes at least three peaks P1, P2, and P3, as illustrated in FIG. 4.

The grain size distribution of the magnetic particles of the body 50 may include a first peak P1, a second peak P2, and a third peak P3. The grain size corresponding to the third peak P3 may be four through fifteen times larger than that corresponding to the second peak P2, and the grain size corresponding to the second peak P2 may be two to seven times larger than that corresponding to the first peak P1.

When the grain sizes corresponding to the first peak P1, the second peak P2, and the third peak P3 are controlled to be within the above ranges, permittivity and inductance of the body 50 may be improved.

The third peak P3 may appear in the grain size of 8 μm to 30 μm, the second peak P2 may appear in the grain size of 2.5 μm to 5.0 μm, and the first peak P1 may appear in the grain size equal to or less than 1.5 μm.

The third peak P3 may be a peak of the first magnetic particle, the second peak P2 may be a peak of the second magnetic particle, and the first peak P1 may be a peak of the third magnetic particle.

As described above, the body 50 is formed by mixing the first magnetic particles 51, the second magnetic particles 52, and the third magnetic particles 53 having different grain size distribution to improve the density of the magnetic particles in the body 50, and thus, permittivity may be remarkably improved, thereby improving inductance and the Lsat value.

Further, according to the exemplary embodiment, forming the body 50 of the first through third magnetic particles having at least three kinds of different grain sizes may further improve the density of the magnetic particles in the body 50 rather than forming the body 50 of the magnetic particles having two kinds of grain sizes.

The first to third magnetic particles 51, 52, and 53 may be formed of amorphous metals including iron (Fe).

When the second magnetic particles 52 and the third magnetic particles 53 having a relatively reduced size as well as the first magnetic particles 51 having a relatively larger size are formed of the amorphous metal, it may be advantageous in improving inductance performance, or the like, and the shape of the magnetic particles may be easily implemented in a spherical shape to effectively improve density.

According to the exemplary embodiment, the first magnetic particles 51 may include Fe—Cr—Si—B—C based amorphous metal particles.

The Fe—Cr—Si—B—C based amorphous metal may include 72 to 80 wt % of iron (Fe), 0.5 to 3.0 wt % of chromium (Cr), 4.5 to 8.5 wt % of silicon (Si), 0.5 to 2.0 wt % of boron (B), and 0.5 to 2.0 wt % of carbon (C) and when the Fe—Cr—Si—B—C based amorphous metal has the above composition, Fe—Cr—Si—B—C based amorphous metal may be crystalline and amorphous.

The second magnetic particles may include at least one of the Fe—Cr—Si—B—C based amorphous metal particles and Fe metal particles, and the third magnetic particles may include at least one of Fe—B—P based amorphous metal particles and nickel (Ni) particles.

The Fe—B—P based amorphous metal may include 87 to 93 wt % of iron (Fe), 5 to 11 wt % of boron (B), and 1 to 3 wt % of phosphorous (P).

The second and third magnetic particles may each be formed by mixing the Fe—B—P based amorphous metal particles and the nickel (Ni) particles.

When the first magnetic particles include the Fe—Cr—Si—B—C based amorphous metal, and the second and third magnetic particles include at least one of the Fe—B—P based amorphous metal and the nickel (Ni), permittivity and inductance may be further improved.

Grain size distribution of the first magnetic particle 51 may be four through fifteen times larger than a grain size distribution of the second magnetic particles 52, and grain size distribution of the second magnetic particle 52 may be two through seven times larger than grain size distribution $D_{50}$ of the third magnetic particles 53.

Here, when an area per 1 field of vision of a photograph obtained by photographing a section of the body 50 at 1,000 magnifications by a scanning electron microscope (SEM) is set to be 12.5 μm2, the grain sizes of the magnetic particles corresponding to 50 fields of vision are obtained to arrange the magnetic particles in order of a small grain size and the grain sizes of ranking in which the total sum of the respective grain sizes reaches 50% of the whole field of vision are defined as grain size distribution $D_{50}$ at the field of vision thereof.

When the grain size distribution $D_{50}$ of the first magnetic particles 51 is four through fifteen times larger than the grain size distribution $D_{50}$ of the second magnetic particles 52, and the grain size distribution $D_{50}$ of the second magnetic particles 52 is two to seven times larger than the grain size distribution $D_{50}$ of the third magnetic particles 53, density may be remarkably improved, and permittivity may be increased to remarkably improve inductance.

According to the exemplary embodiment when viewing one section of the fractured body, when a sum of cross sectional areas occupied by the first magnetic particles 51 is a and a sum of the cross sectional areas occupied by the second magnetic particles 52 and the third magnetic particles 53 is b, the first through third magnetic particles may be included in the body so that a:b corresponds to 5:5 through 9:1.

When the first through third magnetic particles 51, 52, and 53 are included in the body 50 at the mixing ratio of the above range, density may be improved, and high permittivity may occur.

When viewing one section of the fractured body, the ratio of the sum of the cross sectional areas of the second magnetic particles 52 and the sum of the cross sectional areas of the third magnetic particles 53 that are included in the body may correspond to 5:5 through 9:1.

For example, when viewing one section of the fractured body, the ratio of the cross sectional areas occupied by the first magnetic particles:the cross sectional areas occupied by the second magnetic particles:the cross sectional areas occupied by the third magnetic particles may be 5:4.5:0.5 through 9:0.9:0.1. When the first through third magnetic particles are included in the body at the mixing ratio of the above range, density may be improved and high permittivity may occur.

The body 50 according to the exemplary embodiment may achieve density of 70% or more.

Method of Manufacturing Coil Component

Figure 5:
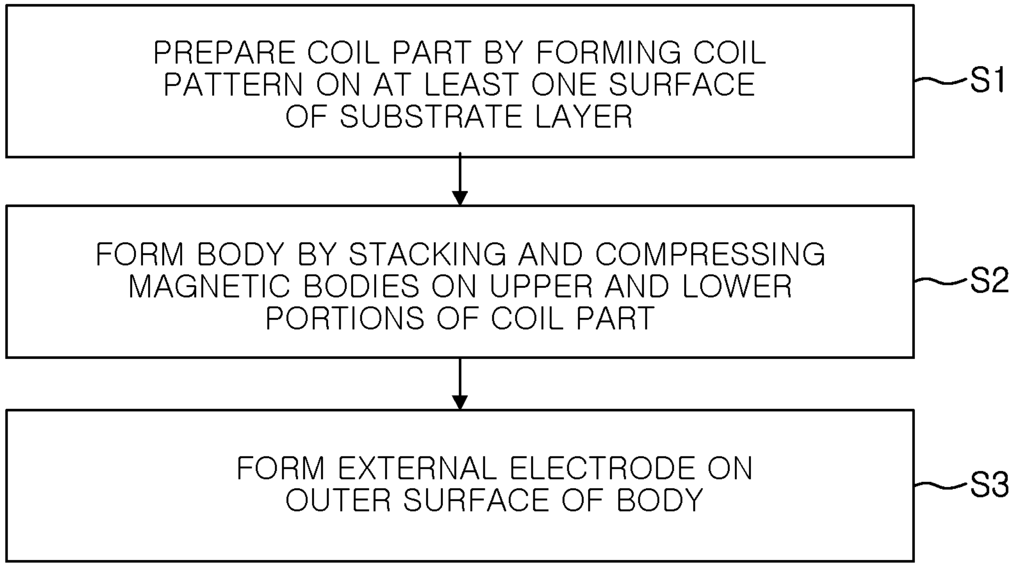
FIG. 5 is a flow chart illustrating a method of manufacturing a coil component according to an exemplary embodiment in the present disclosure.

FIG. 5 is a flow chart illustrating a method of manufacturing a coil component according to an exemplary embodiment, and FIGS. 6A through 6D are diagrams sequentially illustrating the method of manufacturing a coil component according to an exemplary embodiment.

Referring to FIG. 5, the method of manufacturing a coil component according to the exemplary embodiment includes preparing a coil part by forming a coil pattern on at least one surface of a substrate layer (S1), and forming a body by stacking and compressing magnetic bodies on upper and lower portions of the coil part (S2).

The method of manufacturing a coil component according to the exemplary embodiment may further include forming external electrodes on outer surfaces of the body (S3) after the forming of the body.

Figure 6A:
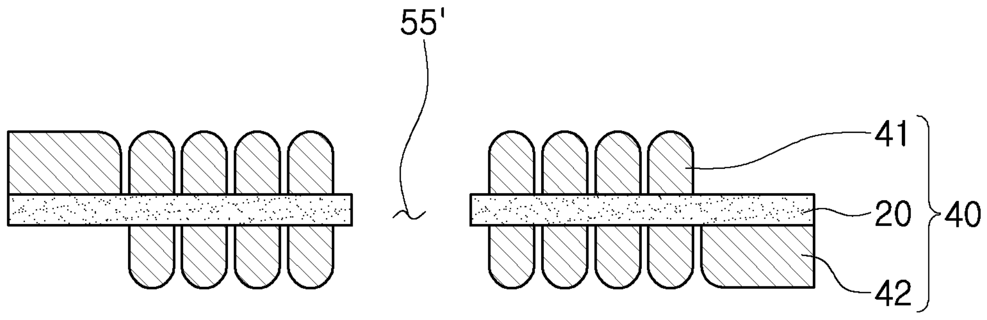
FIGS. 6A through 6D are diagrams sequentially illustrating the method of manufacturing a coil component according to an exemplary embodiment in the present disclosure.

Referring to FIG. 6A, the material of the substrate layer 20 is not particularly limited. Therefore, an example of the material of the substrate layer 20 may include polypropylene glycol (PPG), ferrite, or a metal-based soft magnetic material, and the substrate layer 20 may have a thickness of 40 μm to 100 μm.

Although not illustrated, the forming of the coil patterns 41 and 42 may include forming a plating resist having a coil pattern forming an opening on the substrate layer 20. The plating resist may be a dry film resist, or the like, as a general photosensitive resist film, but is not particularly limited thereto.

The coil patterns 41 and 42 may be formed by filling the opening part for forming the coil patterns with an electroconductive metal using electroplating and the like.

The coil patterns 41 and 42 may include a metal having excellent electrical conductivity such as silver (Ag), palladium (Pd), aluminum (Al), nickel (Ni), titanium (Ti), gold (Au), copper (Cu), platinum (Pt), alloys thereof, or the like.

Although not illustrated, after the forming of the coil patterns 41 and 42, the plating resist may be removed by chemical etching and the like.

When the plating resist is removed, the coil part 40 in which the coil patterns 41 and 42 are formed on the substrate layer 20 may be formed, as illustrated in FIG. 6A.

A hole may be formed in a portion of the substrate layer 20 and may be filled with a conductive material to form a via electrode (not illustrated), and the coil patterns 41 and 42 formed on one surface and another surface of the substrate layer 20 may be electrically connected to each other through the via electrode.

A hole 55' penetrating through the substrate layer 20 may be formed in a central portion of the substrate layer 20 by a drilling method, a laser, sand blasting, punching, or the like.

Figure 6B:
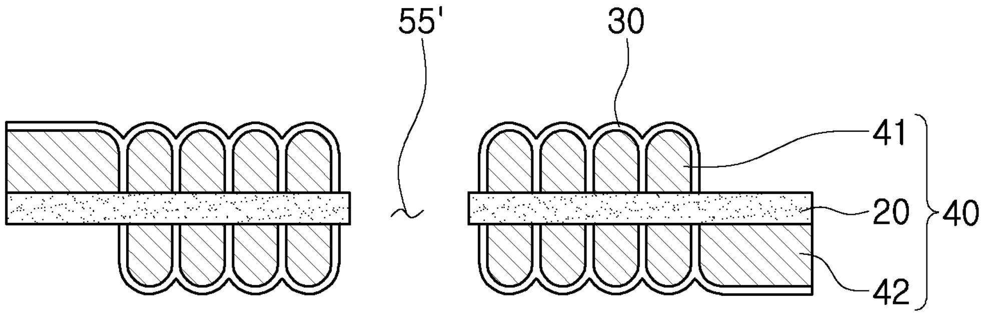

As illustrated in FIG. 6B, after the coil patterns 41 and 42 are formed, an insulation layer 30 covering the coil patterns 41 and 42 may be selectively formed. The insulating layer 30 may be formed by a method well known in the art such as a screen printing method, an exposure and development method of a photo resist (PR), a spray application method, or the like, but the forming method of the insulation layer is not limited thereto.

Figure 6C:
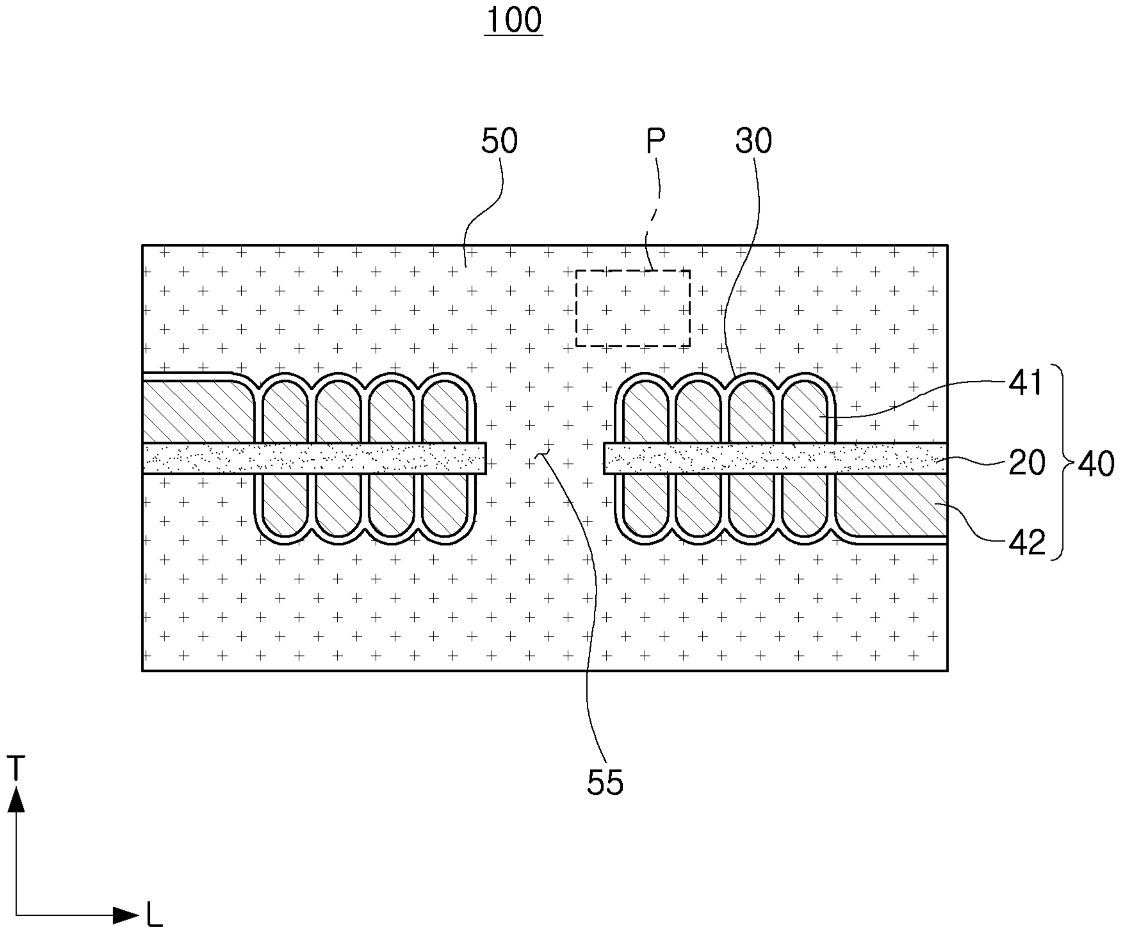

Next, as illustrated in FIG. 6C, the body 50 may be formed by disposing the magnetic bodies on the upper and lower portions of the substrate layer 20 on which the coil patterns 41 and 42 are formed.

The magnetic bodies may be disposed on the upper and lower portions of the substrate layer in the form of the magnetic layer.

The magnetic layers may be stacked on both surfaces of the substrate layer 20 on which the coil patterns 41 and 42 are formed, and may be compressed by a laminate method or an isostatic press method to form the body 50. In this case, the hole may be filled with the magnetic material to form the core part 55.

The magnetic layer may be formed by including a magnetic paste composition for the coil component, in which the magnetic paste composition for the coil component may include the magnetic particles included in the body of the coil component according to the exemplary embodiment as described above.

The magnetic body layer may include the plurality of magnetic particles. The magnetic particles may include the first magnetic particles, the second magnetic particles, and the third magnetic particles. The diameter of the first magnetic particles may range from 8 μm to 30 μm, the diameter of the second magnetic particles may range from 2.5 μm to 5.0 μm, and the diameter of the third magnetic particles may be equal to or less than 1.5 μm.

Further, the grain size distribution of the magnetic particles included in the magnetic layer may include at least three peaks.

The description of the magnetic particles included in the above-mentioned coil component in the description of the method of manufacturing a coil component according to the exemplary embodiment may be likewise applied, and therefore, a detailed description thereof will be omitted below to avoid an overlapping description.

Figure 6D:
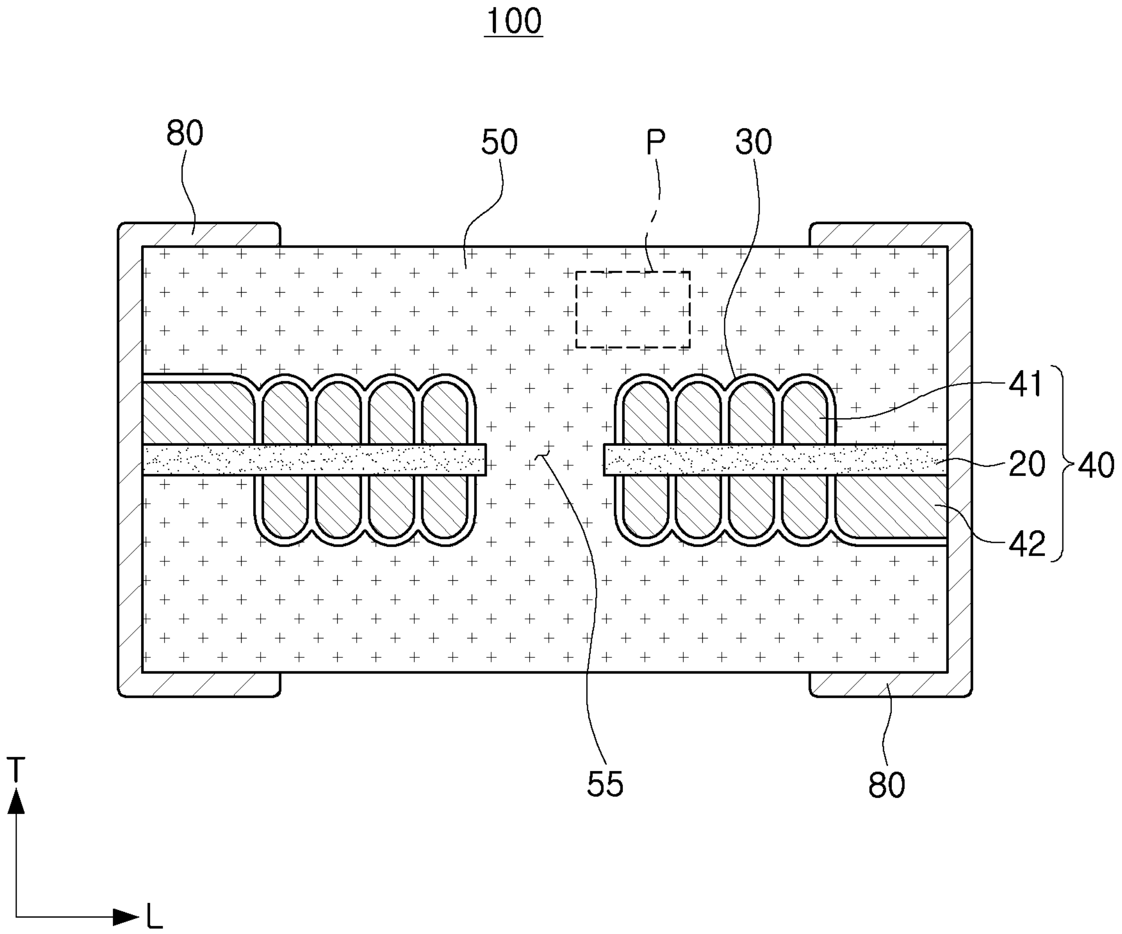

Next, as illustrated in FIG. 6D, the external electrodes 80 may be connected to end portions of the coil patterns 41 and 42 that are exposed to at least one surface of the body 50.

The external electrodes 80 may be formed of a paste including a metal having excellent electrical conductivity, wherein the paste may be a conductive paste containing, for example, nickel (Ni), copper (Cu), tin (Sn), or silver (Ag) alone, or alloys thereof. The external electrodes 80 may be formed by a dipping method, or the like, as well as a printing method depending on a shape thereof.

A description of features that are the same as those of the coil component according to the exemplary embodiment described above will be omitted to avoid an overlapping description.

The following Tables 1 and 2 are tables showing the results of the values of the density, permittivity, and inductance of the thin film inductor depending on the mixing volume ratio of the first magnetic particles which are formed of the Fe—Si—B—Cr based amorphous metal, the second magnetic materials which are formed of the Fe—Cr—Si—B—C based amorphous metal, and the third magnetic particles which are formed of the Fe—B—P based amorphous metal.

TABLE 1

| | Mixing volume ratio | | | | |
|---|---|---|---|---|---|
| | First magnetic particle ($D_{50}$ = 14 μm) | Second magnetic particle ($D_{50}$ = 3 μm) | Third magnetic particle ($D_{50}$ = 0.75 μm) | Density (%) | Permittivity (μ) |
| Example 1 | 6.7 | 2.8 | 0.5 | 76.2 | 27.8 |
| Example 2 | 6.5 | 2.8 | 0.7 | 77.5 | 29.9 |
| Example 3 | 6.3 | 2.7 | 1 | 77.4 | 29.6 |
| Example 4 | 6.2 | 2.7 | 1.1 | 78.1 | 30.0 |

TABLE 2

| | 3 MHz | | |
|---|---|---|---|
| | Ls (uH) | Q | Rs |
| Example 1 | 0.73 | 51.7 | 265.71 |
| Example 2 | 0.78 | 49.5 | 299.14 |
| Example 3 | 0.79 | 49.5 | 298.80 |
| Example 4 | 0.78 | 49.5 | 302.31 |

As set forth above, according to the exemplary embodiments, it is possible to provide the coil component capable of increasing density of the magnetic particles in the body and improving permittivity, inductance, and an Lsat value.

While exemplary embodiments have been shown and described above, it will be apparent to those skilled in the art that modifications and variations could be made without departing from the spirit and scope of the present disclosure as defined by the appended claims.

What is claimed is:

1. A coil component, comprising:

a body having a coil part disposed therein; and external electrodes connected to the coil part, wherein the body includes magnetic particles, wherein the magnetic particles include:

first magnetic particles, second magnetic particles, and third magnetic particles, wherein the third magnetic particles include a smallest peak diameter among the first to third magnetic particles, and the first magnetic particles include a largest peak diameter among the first to third magnetic particles, wherein the first magnetic particles include Fe-chromium (Cr)-silicon (Si)-boron (B)-carbon (C) based amorphous metal particles, wherein the second magnetic particles include at least one of Fe—Cr—Si—B—C based amorphous metal particles or Fe metal particles, and wherein the third magnetic particles include Fe—B-phosphorous (P) based amorphous metal particles.

2. The coil component of claim 1, wherein a diameter of the first magnetic particles ranges from 8 μm to 30 μm, a diameter of the second magnetic particles ranges from 2.5 μm to 5.0 μm, and a diameter of the third magnetic particles is more than 0 μm and equal to or less than 1.5 μm.

3. The coil component of claim 1, wherein, at a fractured plane of the body, when a sum of cross sectional areas occupied by the first magnetic particles is a, and a sum of cross sectional areas occupied by the second magnetic particles and the third magnetic particles is b, the first through third magnetic particles are mixed so that a:b corresponds to 5:5 through 9:1.

4. The coil component of claim 1, wherein, at a fractured plane of the body, the second magnetic particles and the third magnetic particles are mixed so that a ratio of a sum of cross sectional areas occupied by the second magnetic particles and a sum of cross sectional areas occupied by the third magnetic particles is 5:5 through 9:1.

5. The coil component of claim 1, wherein the magnetic particles of the body have grain size distribution including at least three peaks.

6. The coil component of claim 1, wherein the first through third magnetic particles include iron (Fe).

7. The coil component of claim 6, wherein the Fe—Cr—Si—B—C based amorphous metal includes 72 to 80 wt % of Fe, 0.5 to 3.0 wt % of Cr, 4.5 to 8.5 wt % of Si, 0.5 to 2.0 wt % of B, and 0.5 to 2.0 wt % of C.

8. The coil component of claim 1, wherein when viewing one section of the body, a ratio of cross sectional areas occupied by the first magnetic particles:cross sectional areas occupied by the second magnetic particles:cross sectional areas occupied by the third magnetic particles is 5:4.5:0.5 through 9:0.9:0.1.

9. The coil component of claim 1, wherein the coil part includes a substrate layer and a coil pattern disposed on at least one surface of the substrate layer.

10. The coil component of claim 1, wherein the body further includes a thermosetting resin.

11. The coil component of claim 1, wherein a magnetic particle density of the body is equal to or more than 70%.

12. The coil component of claim 1, wherein the Fe—B—P based amorphous metal includes 87 to 93 wt % of Fe, 5 to 11 wt % of B, and 1 to 3 wt % of P.

13. A coil component including a body having a coil part disposed therein, wherein the body includes a plurality of magnetic particles, wherein the magnetic particles included in the body have grain size distribution of a first peak, a second peak, and a third peak, wherein a grain size of the magnetic particles corresponding to the third peak is four through fifteen times larger than that of the magnetic particles corresponding to the second peak, and the grain size of the magnetic particles corresponding to the second peak is two through seven times larger than that of the magnetic particles corresponding to the first peak, and wherein the magnetic particles include Fe—Cr—Si—B—C based amorphous metal particles in the third peak, at least one of Fe—Cr—Si—B—C based amorphous metal particles or Fe metal particles in the second peak, and Fe—B—P based amorphous metal particles in the first peak.

14. The coil component of claim 13, wherein the third peak in the grain size distribution ranges from 8 μm to 30 μm, the second peak in the grain size distribution ranges from 2.5 μm to 6.0 μm, and the first peak in the grain size distribution ranges from more than 0 μm and equal to or less than 1.5 μm.

15. A method of manufacturing a coil component, comprising:

preparing a coil part by forming a coil pattern on at least one surface of a substrate layer;

forming a body by stacking and compressing magnetic bodies on upper and lower portions of the coil part; and forming an external electrode on an outer surface of the body so that the external electrode is connected to the coil pattern, wherein the body includes magnetic particles, and the magnetic particles include:

first magnetic particles, second magnetic particles, and third magnetic particles, wherein the third magnetic particles include a smallest peak diameter among the first to third magnetic particles and the first magnetic particles include a largest peak diameter among the first to third magnetic particles, wherein the first magnetic particles include Fe—Cr—Si—B—C based amorphous metal particles, wherein the second magnetic particles include at least one of Fe—Cr—Si—B—C based amorphous metal particles or Fe metal particles, and wherein the third magnetic particles include Fe—B—P based amorphous metal particles.

16. The method of claim 15, wherein a diameter of the first magnetic particles ranges from 8 pun to 30 μm, a diameter of the second magnetic particles ranges from 2.5 μm to 5.0 μm, and a diameter of the third magnetic particles ranges from more than 0 μm and equal to or less than 1.5 μm.

17. The method of claim 16, wherein the forming of the coil patterns includes forming an opening, on the substrate layer and filling the opening part with an electro-conductive metal and forming an insulation layer to cover the coil patterns.

* * * * *